UNITED STATES PATENT OFFICE.

JOSEPH BENDA, OF YATTON, IOWA.

IMPROVEMENT IN MEDICAL COMPOUNDS OR LINIMENTS.

Specification forming part of Letters Patent No. 138,313, dated April 29, 1873; application filed April 5, 1873.

*To all whom it may concern:*

Be it known that I, JOSEPH BENDA, of Yatton, in the county of Washington and State of Iowa, have invented a new and Improved Liniment, of which the following is a specification:

The object of my invention is to furnish an improved liniment for internal and external diseases, such as rheumatism, colic, diarrhea, headache, &c., to be used either by rubbing the parts lightly with it or by mixing it with water.

The liniment consists of a mixture of volatile oils and vegetable tinctures with alcohol in the following proportions: Oil of sassafras, half ounce; oil of hemlock, half ounce; spirits of turpentine, half ounce; tincture of Cayenne pepper, half ounce; tincture of catechu, half ounce; guaiac, half ounce; tincture of opium, half ounce; tincture of myrrh, two ounces; oil of origanum, one ounce; wintergreen, quarter ounce; gum camphor, one ounce; chloroform, three-fourths ounce; oil of cedar, half ounce.

This compound is dissolved in ninety-eight parts of alcohol, forming a light-reddish liquid. It is used externally by rubbing it on the parts required, and internally by mixing one teaspoonful with one and a half gills of water.

It has a very invigorating effect, stimulating the action of the nerves and deadening pain.

Having thus described my invention, I claim as new and desire to secure by Letters Patent—

The liniment consisting of a mixture of ninety-eight per cent. alcohol with two per cent. of the vegetable oils and extracts, in the proportions given, substantially as set forth and specified.

JOSEPH BENDA.

Witnesses:
   T. J. PIGG,
   JOHN A. TOUSEY.